United States Patent [19]

Ichimaru et al.

[11] Patent Number: 5,569,851
[45] Date of Patent: Oct. 29, 1996

[54] METER FOR MEASURING AIR FLOW BY RESISTANCE HEATING

[75] Inventors: Masahiro Ichimaru; Izumi Watanabe, both of Katsuta, Japan

[73] Assignees: Hitachi, Ltd.; Hitachi Automotive Engineering Co., Ltd., both of Japan

[21] Appl. No.: 264,067

[22] Filed: Jun. 22, 1994

[30] Foreign Application Priority Data

Jun. 22, 1993 [JP] Japan ................................. 5-150103

[51] Int. Cl.$^6$ ................................................ G01F 1/68
[52] U.S. Cl. .................................... 73/204.15; 73/204.26
[58] Field of Search ...................... 73/204.15, 204.25, 73/204.26, 204.27, 204.16, 204.17, 204.14

[56] References Cited

U.S. PATENT DOCUMENTS

| | | | |
|---|---|---|---|
| Re. 33,076 | 10/1989 | Sugiura | 73/204.15 |
| 3,975,951 | 8/1976 | Kohama et al. | 73/204.16 |
| 4,059,982 | 11/1977 | Bowman | 73/204.17 |
| 4,335,605 | 6/1982 | Boyd | 73/204.14 |
| 4,683,858 | 8/1987 | Sato et al. | 73/204.16 |
| 4,920,793 | 5/1990 | Djorup | 73/204.14 |
| 5,117,691 | 6/1992 | Fraser | 73/204.15 |
| 5,237,867 | 8/1993 | Cook, Jr. | 73/204.26 |

OTHER PUBLICATIONS

Flow measuring apparatus by Okada Pub. No. JA 0158562.

*Primary Examiner*—Richard Chilcot
*Assistant Examiner*—Harshad Patel
*Attorney, Agent, or Firm*—Evenson, McKeown, Edwards & Lenahan P.L.L.C.

[57] ABSTRACT

The characteristic of the present invention is that in a heating resistor portion and a lead member for electrically connecting the resistor portion to an external device, the lead member is composed of a first lead member for supplying a current to the resistor portion and second lead member for measuring a voltage in the resistor. According to an error in heat control due to resistances of a support, welding portion, wire bonding portion, etc. between a terminal of a sensing element and a driving circuit can be eliminated to thereby detect an air flow rate with a high accuracy.

4 Claims, 11 Drawing Sheets

METER FOR MEASURING AIR FLOW BY RESISTANCE HEATING

BACKGROUND AND SUMMARY OF THE INVENTION

The present invention relates to an air flow meter for detecting an air flow rate, and more particularly to a resistance heating type air flow meter suitable for measurement of an intake air quantity to be sucked into an internal combustion engine.

A conventional thermal type air flow meter for measuring an intake air quantity to be sucked into an internal combustion engine is described in Japanese Patent Laid-open No. Hei 4-186123, for example. In this thermal type air flow meter, a temperature sensing resistor located in an auxiliary passage is electrically connected through a conductive support to a driving circuit provided outside a main passage.

Further, a conventional temperature sensing resistor is described in Japanese-Patent Laid-open No. Hei 2-205721, for example. This temperature sensing resistor has a structure such that lead wires are connected to both ends of a sensing element. Thus, the temperature sensing resistor is electrically connected through the lead wires to an external device.

In the prior art mentioned above, various resistor portions such as a support, welding portion, and wire bonding portion are present between a terminal of the sensing element and the driving circuit. A resistance in such resistor portions is not constant, causing an error in measurement of a temperature of the sensing element or in heat control. In recent years, the detection of an air flow rate with a high accuracy has been demanded, so that an influence of the resistor portions present between the sensing element and the driving circuit is not ignorable. Such a circumstance is not sufficiently considered in the prior art mentioned above.

It is accordingly an object of the present invention to provide a resistance heating type air flow meter and a temperature sensing resistor which can detect an air flow rate with a high accuracy.

According to a first aspect of the present invention, there is provided a resistance heating type air flow meter for measuring an air flow rate by using a heating resistor having a resistor portion and a lead member for electrically connecting the resistor portion to an external device, wherein the lead member comprises a first lead member for supplying a current to the resistor portion and a second lead member for measuring a voltage in the resistor portion. According to a second aspect of the present invention, there is provided a resistance heating type air flow meter for measuring air flow rate by using a heating resistor, wherein the heating resistor has a connector portion having four terminals electrically connected together. Therefore, according to the present invention, an air flow rate can be detected highly accurately without any influence of wires etc.

DETAILED DESCRIPTION OF THE PREFERRED EMBODIMENTS

There will now be described some preferred embodiments of the present invention with reference to the drawings.

Figure 1:
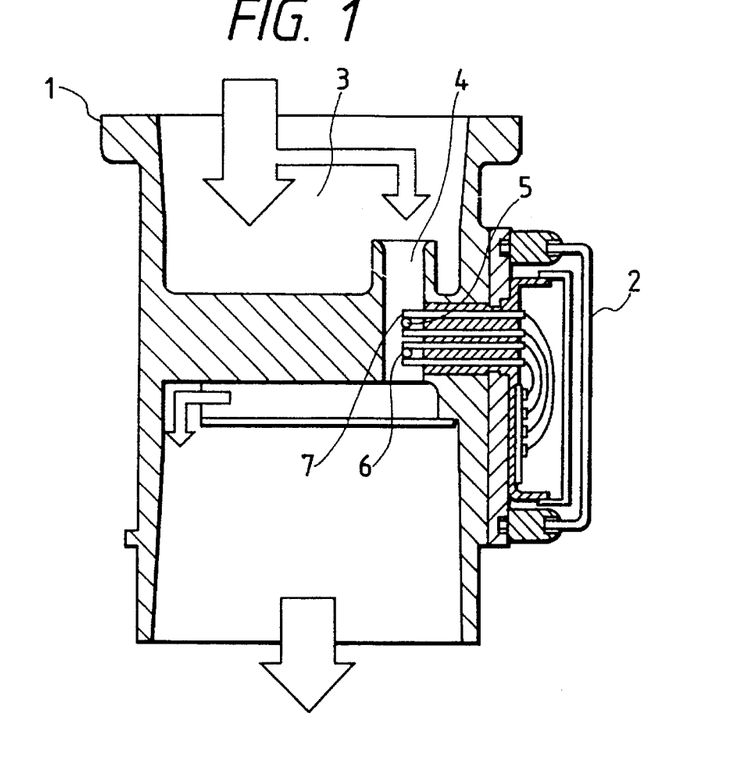
FIG. 1 is a sectional view of a hot-wire type air flow meter according to the present invention.

FIG. 1 shows a sectional structure of a basic air flow measuring device, which is generally composed of a body 1 and a module 2. Air sucked into the body 1 is divided to flow into a main passage 3 and an auxiliary passage 4. A heating resistor 5 and a temperature sensing resistor 6 are welded to a support pin 7, and are located in the auxiliary passage 4. The heating resistor 5 located in the auxiliary passage 4 is supplied with current for heating the heating resistor 5 to a given temperature. The heating resistor 5 is heated so that a difference between a heating temperature and an air temperature is kept constant irrespective of an amount of intake air. The air temperature is corrected by the temperature sensing resistor 6.

A unit of the heating resistor 5 and the temperature sensing resistor 6 is designed to have a four-terminal structure capable of measuring an air flow rate by a four-terminal method as shown in FIGS. 2, 3, 4, 5, 6, and 7, thereby reducing the influence of resistance in a welding portion, a conductor member to a circuitboard, etc.

Figure 2:
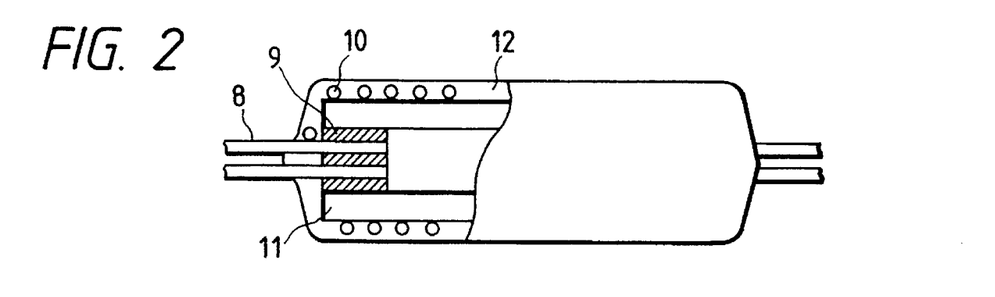
FIG. 2 is a partially cutaway, side view of a first preferred embodiment of a unit of a heating resistor and temperature sensing resistor according to the present invention.

FIG. 2 shows a first preferred embodiment of the structure of the unit of the heating resistor 5 and the temperature sensing resistor 6 in the air flow measuring device shown in FIG. 1. In this structure shown in FIG. 2, four leads 8 are drawn out from both ends of the unit of the heating resistor 5 and the temperature sensing resistor 6. That is, two leads 8 are drawn out from each end of the unit. The two leads 8 are electrically connected at their base portions by a conductive adhesive 9 provided in a ceramic bobbin 11. A resistor 10 is connected to the leads 8 and is covered with a covering member 12. Thus, the unit of the heating resistor and the temperature sensing resistor is constructed to have a four-terminal structure.

Figure 3:
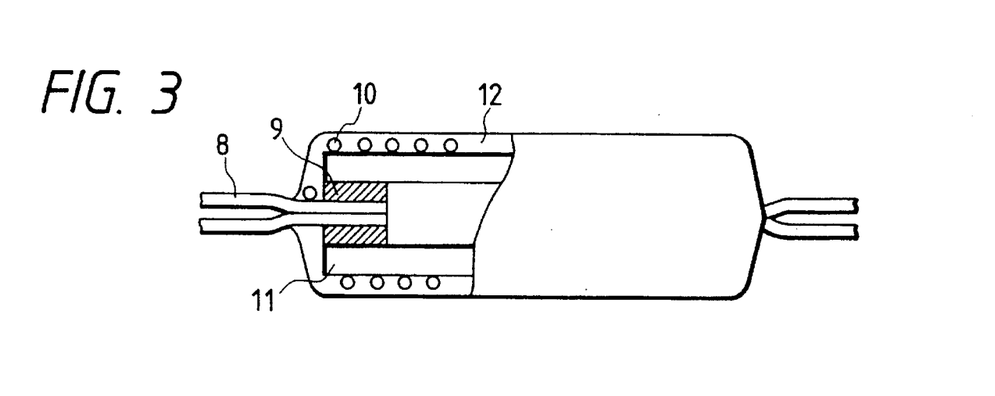
FIG. 3 is a view similar to FIG. 2, showing a second preferred embodiment of the unit.

FIG. 3 shows a second preferred embodiment of the structure of the unit of the heating resistor 5 and the temperature sensing resistor 6 in the air flow measuring device shown in FIG. 1. In this structure shown in FIG. 3, four leads 8 are drawn out from both ends of the unit of the heating resistor 5 and the temperature sensing resistor 6. That is, two leads 8 are drawn out from each end of the unit. The two leads 8 are in close contact with each other at their base portions in a ceramic bobbin 11 to provide electrical connection. The base portions of the two leads 8 thus electrically connected are fixed by a conductive adhesive 9 or an organic adhesive 13 provided in the ceramic bobbin 11. A resistor 10 is connected to the leads 8 and is covered with a covering member 12. Thus, the unit of the heating resistor and the temperature sensing resistor is constructed to have a four-terminal structure.

Figure 4:
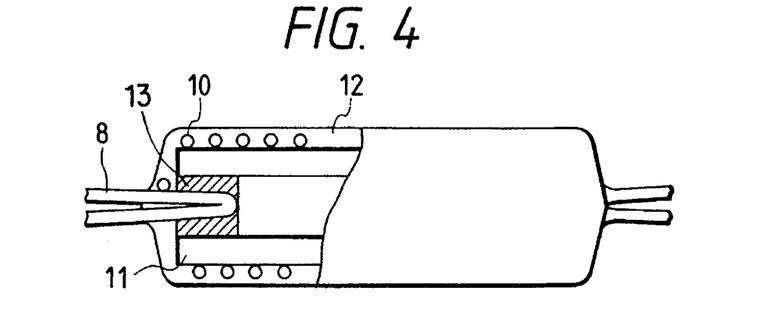
FIG. 4 is a view similar to FIG. 2, showing a third preferred embodiment of the unit.

FIG. 4 shows a third preferred embodiment of the structure of the unit of the heating resistor 5 and the temperature sensing resistor 6 in the air flow measuring device shown in FIG. 1. In this structure shown in FIG. 4, four leads 8 are drawn out from both ends of the unit of the heating resistor 5 and the temperature sensing resistor 6. That is, a lead 8 is folded at its base portion located in a ceramic bobbin 11 and is drawn out from each end of the unit.

The folded portion of the lead 8 is fixed by an organic adhesive 13 in the ceramic bobbin 11. A resistor 10 is connected to the leads 8 and is covered with a covering member 12. Thus, the unit of the heating resistor and the temperature sensing resistor is constructed to have a four-terminal structure.

Figure 5:
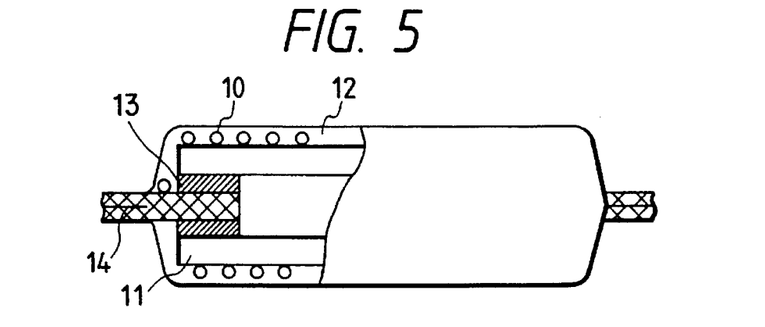
FIGS. 5 and 6 are views similar to FIG. 2, showing a fourth preferred embodiment of the unit.
Figure 6:
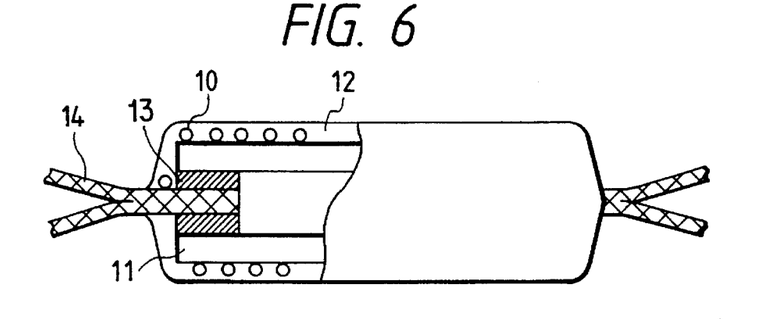

FIGS. 5 and 6 show a fourth preferred embodiment of the structure of the unit of the heating resistor 5 and the temperature sensing resistor 6 in the air flow measuring device shown in FIG. 1. In this structure shown in FIGS. 5 and 6, two net wires 14 are drawn out from both ends of the unit of the heating resistor 5 and the temperature sensing resistor 6. That is, each net wire 14 is drawn out from each end of the unit. The net wire 14 is fixed at its base portion by an organic adhesive 13 in a ceramic bobbin 11.

In actual use, a drawn portion of the net wire 14 is divided into two parts as shown in FIG. 6. A resistor 10 is connected to the net wires 14 and is covered with a covering member 12. Thus, the unit of the heating resistor and the temperature sensing resistor is constructed to have a four-terminal structure.

Figure 7:
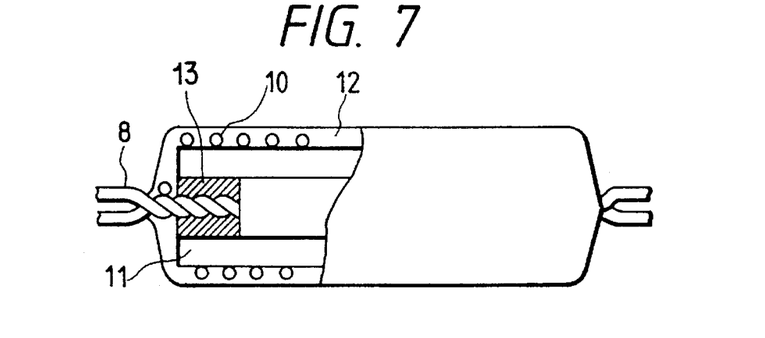
FIG. 7 is a view similar to FIG. 2, showing a fifth preferred embodiment of the unit.

FIG. 7 shows a fifth preferred embodiment of the structure of the unit of the heating resistor 5 and the temperature sensing resistor 6 in the air flow measuring device shown in FIG. 1. In this structure shown in FIG. 7, four leads 8 are drawn out from both ends of the unit of the heating resistor 5 and the temperature sensing resistor 6. That is, two leads 8 are drawn out from each end of the unit. The two leads 8 are twisted at their base portions located in a ceramic bobbin 11 to provide an electrical connection. The base portions of the two leads 8 thus electrically connected are fixed by a conductive adhesive 9 or an organic adhesive 13 in the ceramic bobbin 11. A resistor 10 is connected to the leads 8 and is covered with a covering member 12. Thus, the unit of the heating resistor and the temperature sensing resistor is constructed to have a four-terminal structure.

FIGS. 8, 9, 10, 11, 12, 13, 14, and 15 show various preferred embodiments of a plate like unit of a heating resistor and a temperature sensing resistor having a four-terminal structure.

Figure 8:
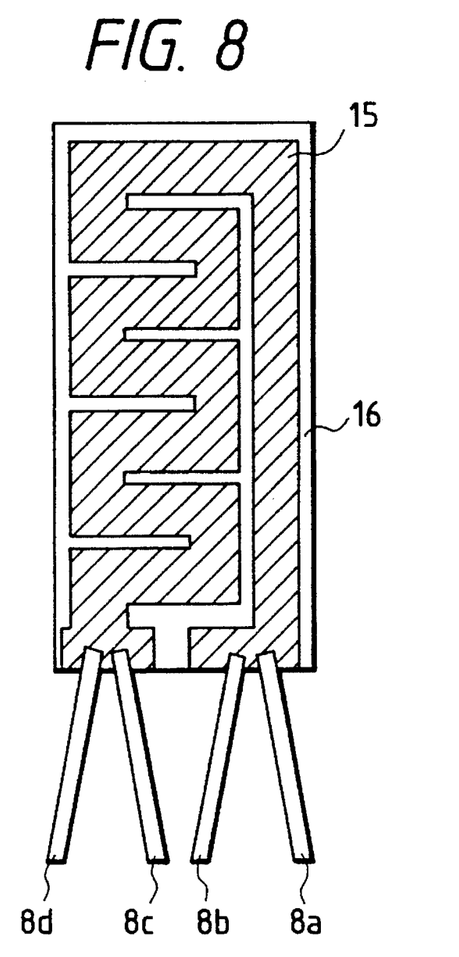
FIG. 8 is a sectional view of a first preferred embodiment of a plate like unit of a heating resistor and a temperature sensing resistor according to the present invention.

FIG. 8 shows a first preferred embodiment of the plate like unit of the heating resistor and the temperature sensing resistor as modified from the preferred embodiment shown in FIG. 2. As shown in FIG. 8, a resistor pattern 15 is formed on a plate 16, and four leads 8a, 8b, 8c, and 8d are connected to the resistor pattern 15. The four leads 8a to 8d are drawn out from one end of the plate 16. Thus, the plate like unit of the heating resistor and the temperature sensing resistor is constructed to have a four-terminal structure.

Figure 9:
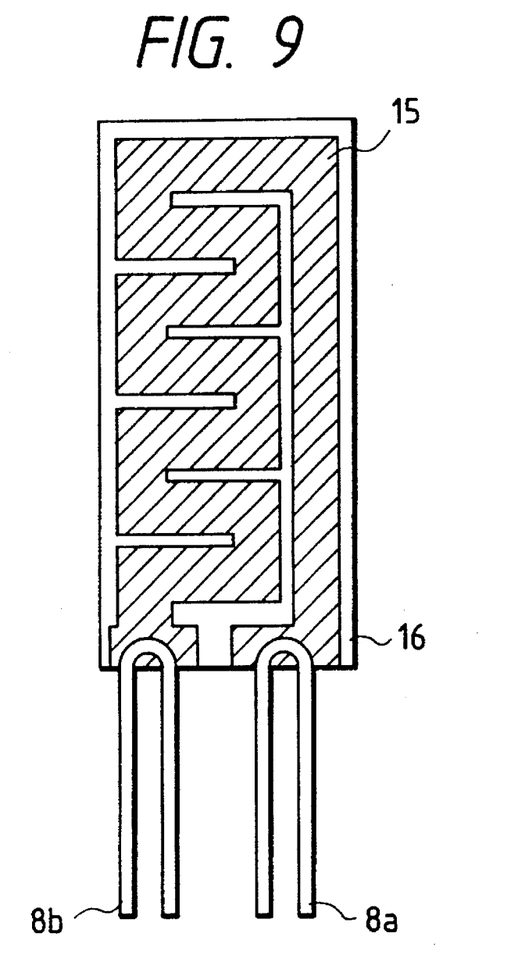
FIG. 9 is a view similar to FIG. 8, showing a second preferred embodiment of the plate like unit.

FIG. 9 shows a second preferred embodiment of the plate like unit of the heating resistor and the temperature sensing resistor as modified from the preferred embodiment shown in FIG. 4. As shown in FIG. 9, a resistor pattern 15 is formed on a plate 16, and two leads 8a and 8b are folded at their base portions. The base portions of the two folded leads 8a and 8b are connected to the resistor pattern 15. The folded two leads 8a and 8b are drawn out from one end of the plate 16. Thus, the plate like unit of the heating resistor and the temperature sensing resistor is constructed to have a four-terminal structure.

Figure 10:
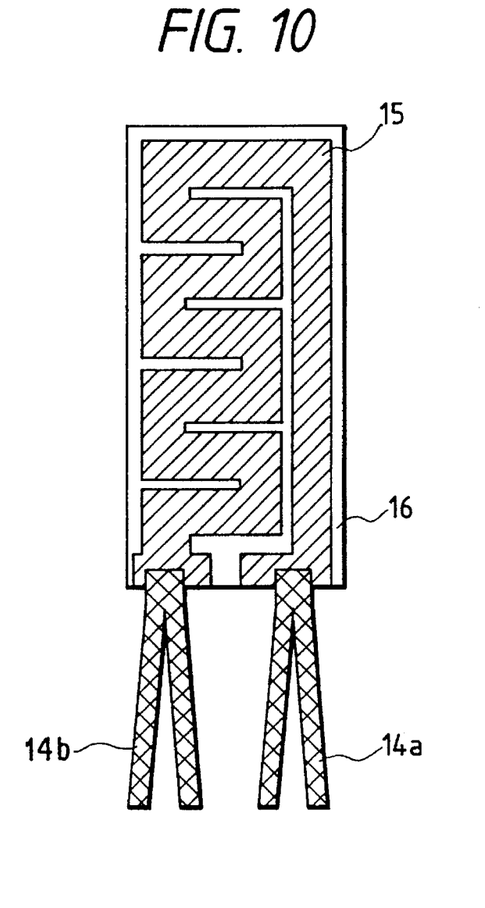
FIG. 10 is a view similar to FIG. 8, showing a third preferred embodiment of the plate like unit.

FIG. 10 shows a third preferred embodiment of the plate like unit of the heating resistor and the temperature sensing resistor as modified from the preferred embodiment shown in FIGS. 5 and 6. As shown in FIG. 10, a resistor pattern 15 is formed on a plate 16, and two net wires 14a and 14b are connected at their base portions to the resistor pattern 15. Each of the two net wires 14a and 14b is divided into two parts as shown. The two net wires 14a and 14b each thus divided are drawn out from one end of the plate 16. Thus, the plate like unit of the heating resistor and the temperature sensing resistor is constructed to have a four-terminal structure.

Figure 11:
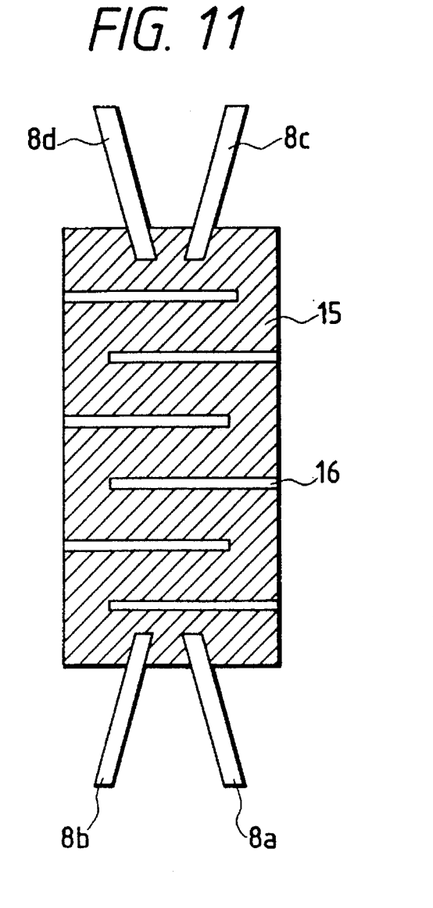
FIG. 11 is a view similar to FIG. 8, showing a fourth preferred embodiment of the plate like unit.

FIG. 11 shows a fourth preferred embodiment of the plate like unit of the heating resistor and the temperature sensing resistor as modified from the preferred embodiment shown in FIG. 8. As shown in FIG. 11, a resistor pattern 15 is formed on a plate 16, and four leads 8a, 8b, 8c, and 8d are connected to the resistor pattern 15. The four leads 8a to 8d are drawn out from both ends of the plate 16.

That is, the leads 8a and 8b are drawn out from one end of the plate 16, and the leads 8c and 8d are drawn out from the other end of the plate 16. Thus, the plate like unit of the heating resistor and the temperature sensing resistor is constructed to have a four-terminal structure.

Figure 12:
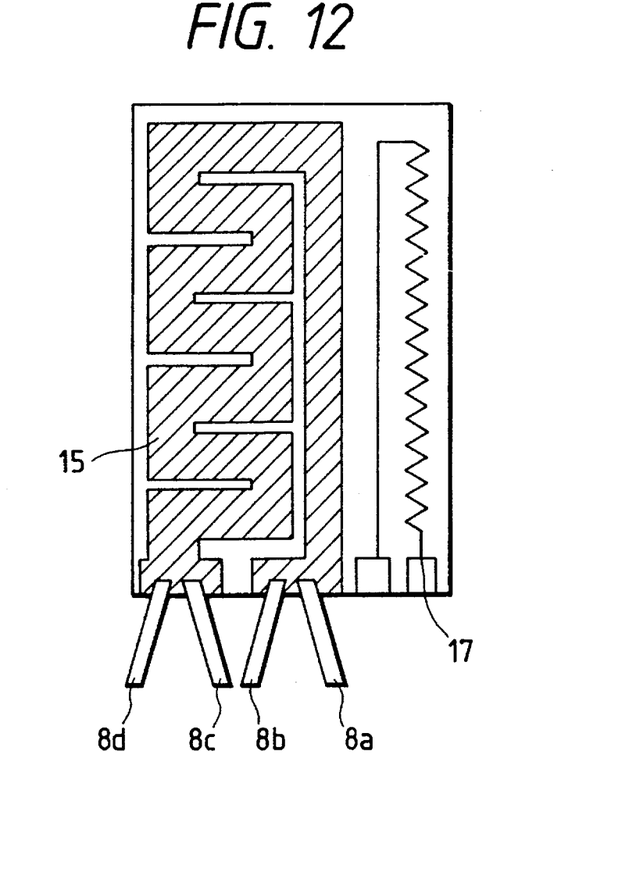
FIG. 12 is a view similar to FIG. 8, showing a fifth preferred embodiment of the plate like unit.

FIG. 12 shows a fifth preferred embodiment of the plate like unit of the heating resistor and the temperature sensing resistor as modified from the preferred embodiment shown in FIG. 8. As shown in FIG. 12, a resistor pattern 15 is formed on a plate 16, and four leads 8a, 8b, 8c, and 8d are connected to the resistor pattern 15. The four leads 8a to 8d are drawn out from one end of the plate 16. Further, an indirect heating element 17 is provided on the plate 16 in the vicinity of the resistor pattern 15. Thus, the plate like unit of the heating resistor and the temperature sensing resistor is constructed to have a four-terminal structure.

Figure 13:
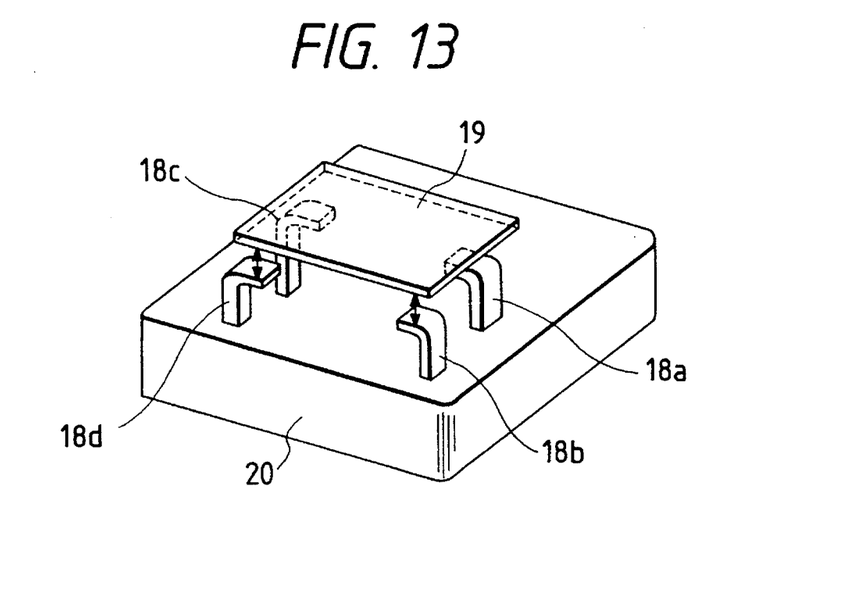
FIG. 13 is a perspective view showing a mounted condition of the plate like unit on terminals.
Figure 14:
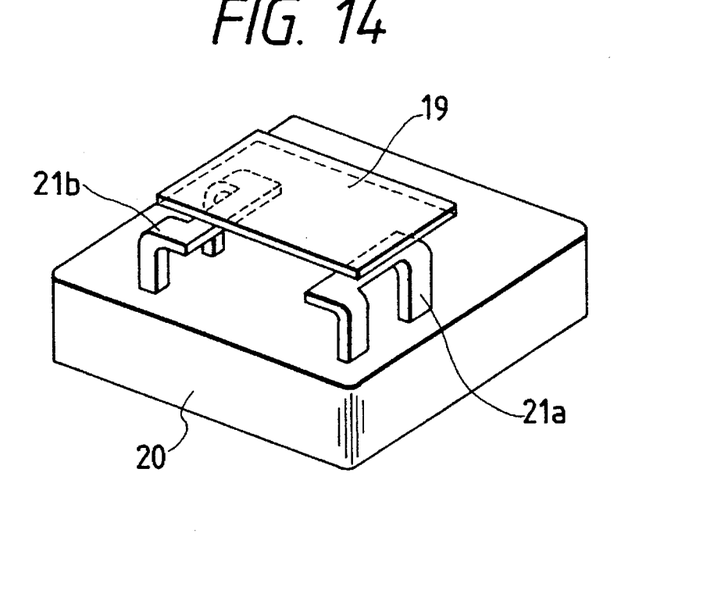
FIG. 14 is a perspective view showing another mounted condition of the plate like unit on terminals.

FIGS. 13 and 14 show various preferred embodiments of a mounted condition of a plate like unit 19 of a heating resistor and a temperature sensing resistor having a four-terminal structure.

In the preferred embodiment shown in FIG. 13, four terminals 18a, 18b, 18c, and 18d are drawn out from a molded member 20, and the plate like unit 19 of the heating resistor and the temperature sensing resistor having a four-terminal structure is mounted at four points on the four terminals 18a to 18d of the molded member 20.

In the preferred embodiment shown in FIG. 14, two terminals 21a and 21b are drawn out from a molded member 20, and the plate like unit 19 of the heating resistor and the temperature sensing resistor having a four-terminal structure is mounted at two points on the two terminals 21a and 21b of the molded member 20.

Figure 15:
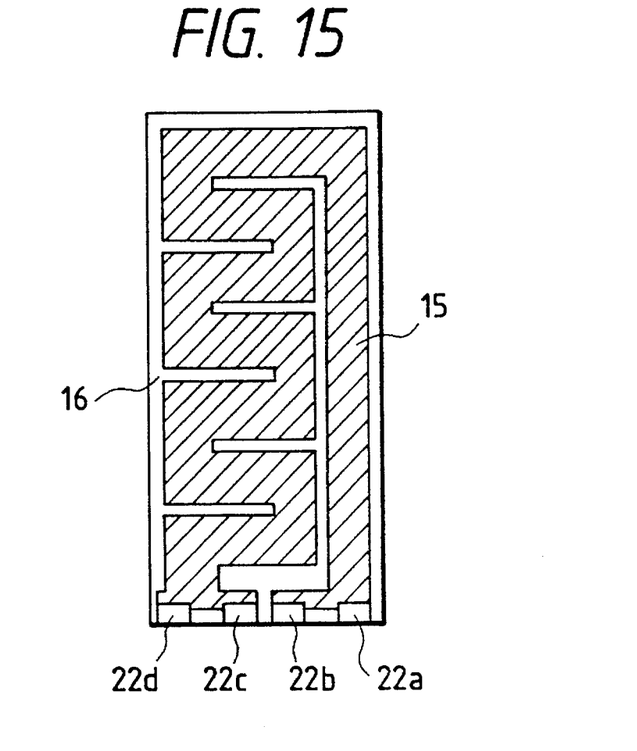
FIG. 15 is a view similar to FIG. 8, showing another preferred embodiment of the plate like unit.

FIG. 15 shows another preferred embodiment of the plate like unit of the heating resistor and the temperature sensing resistor having a four-terminal structure. In this preferred embodiment, four terminals 22a, 22b, 22c, and 22d are connected to a resistor pattern 15 formed on a plate 16.

The four terminals 22a to 22d are located at one end of the plate 16. With this structure, a connectability of the plate like unit is improved, and a general-purpose applicability of the plate like unit is provided.

FIGS. 16, 17, 18, and 19 show various preferred embodiments of a plate like unit 25 of a heating resistor and a temperature sensing resistor having a four-terminal structure, which unit is provided with a connector 23.

Figure 16:
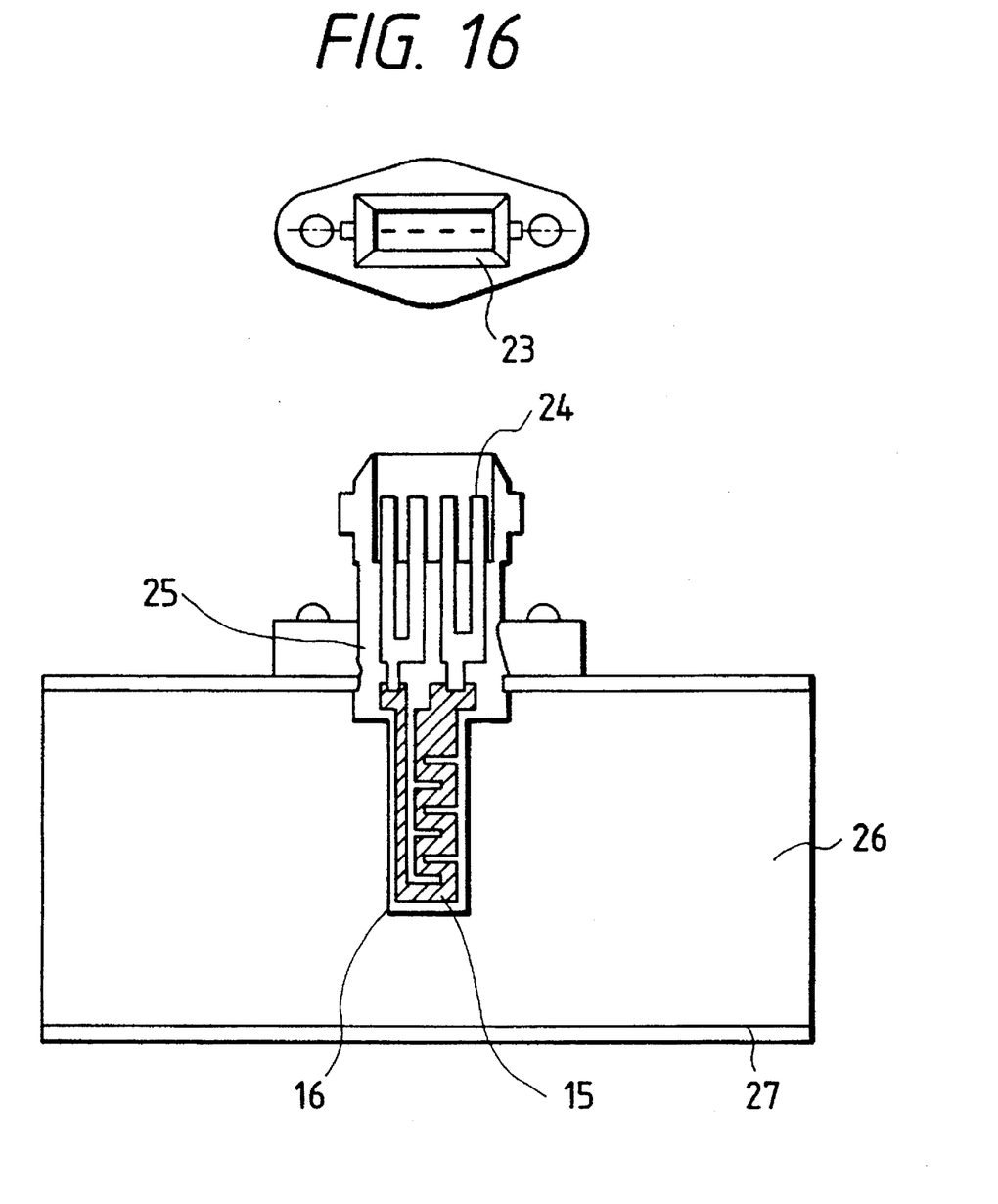
FIG. 16 is a sectional view of a preferred embodiment of a plate like unit provided with a connector, partially shown in plan.

In the preferred embodiment shown in FIG. 16, the plate like unit 25 having the connector 23 is mounted in an air passage 26 defined by a cylinder 27. A resistor pattern 15 formed on a plate 16 is connected to two forked terminals 24 so as to provide a four-terminal structure. Thus, the provision of the connector 23 contributes to improvement in connectability of the plate like unit to the outside.

Figure 17:
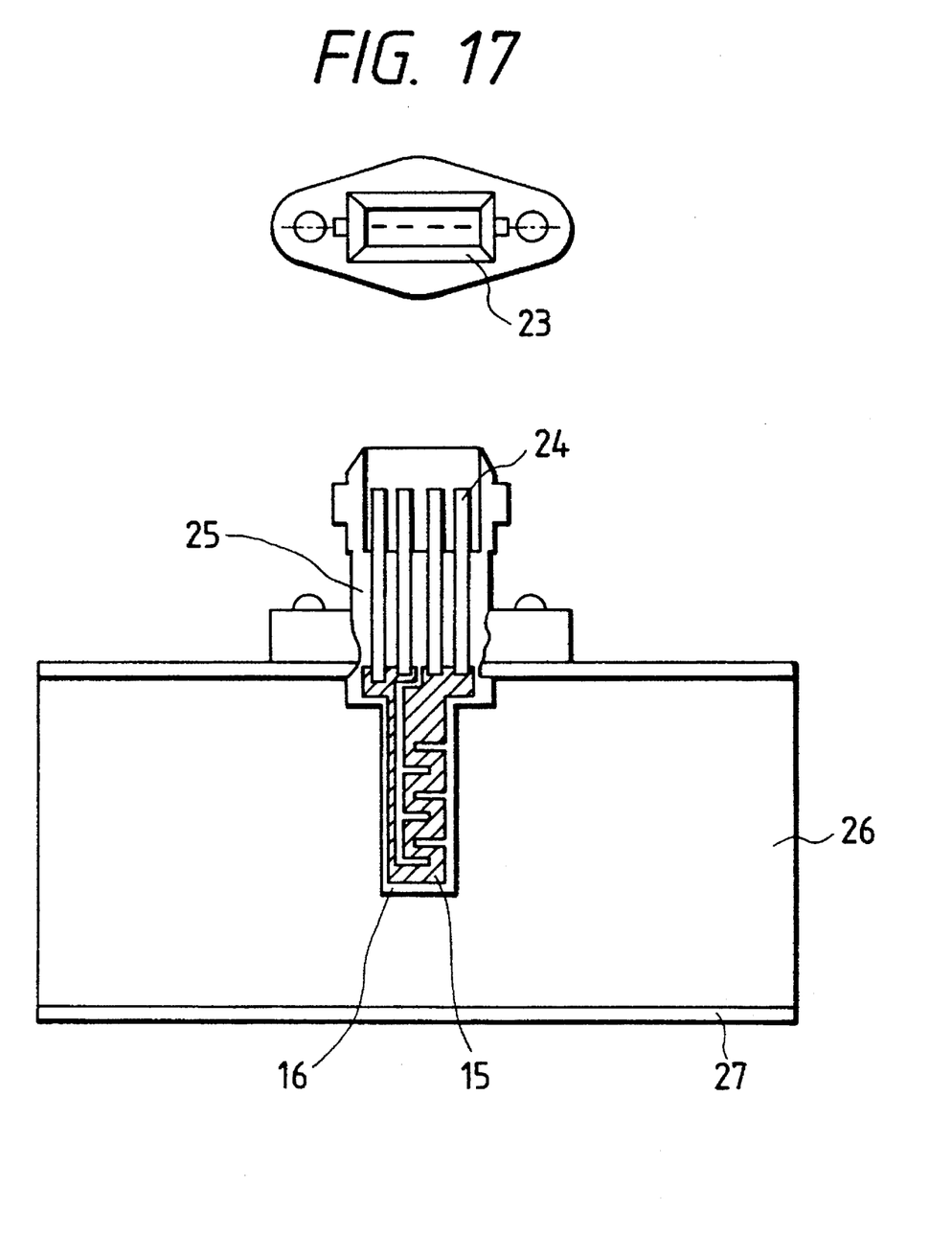
FIG. 17 is a view similar to FIG. 16, showing another preferred embodiment of the plate like unit.

FIG. 17 shows a modification of the structure shown in FIG. 16. In this modification, a resistor pattern 15 formed on a plate 16 is so designed as to be connected to four terminals 24 in such a manner that a four-terminal structure is provided.

Figure 18:
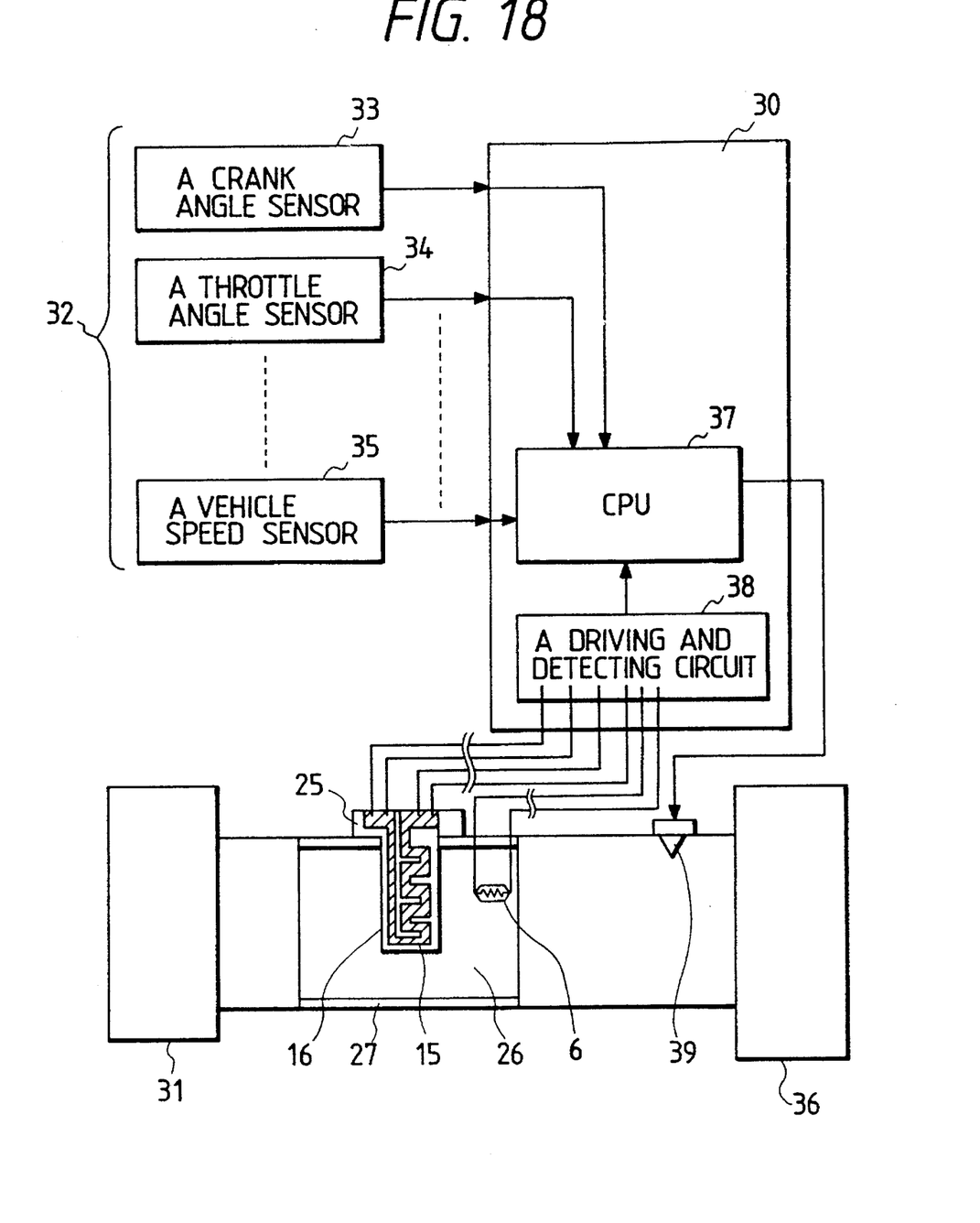
FIG. 18 is a schematic block diagram showing a fuel injection system including the plate like unit.

FIG. 18 is a block diagram showing an actual application of the plate like unit having the connector 23 as shown in FIG. 16 or 17 to an engine. In FIG. 18, reference numeral 30 denotes a control unit. The control unit 30 includes a CPU 37 and a driving and detecting circuit 38 connected to the CPU 37. Various sensors 32 including a crank angle sensor 33, a throttle angle sensor 34, and a vehicle speed sensor 35 are connected to the CPU 37. A unit 25 of a heating resistor and a temperature sensing resistor having a four-terminal structure with a connector 23 as shown in FIG. 16 or 17 is connected to the driving and detecting circuit 38.

The CPU 37 inputs signals from the sensors 32 and the unit 25 through the driving and detecting circuit 38 to control a fuel injector 39. Reference numerals 31 and 36 denote an air cleaner and an engine, respectively.

Figure 19:
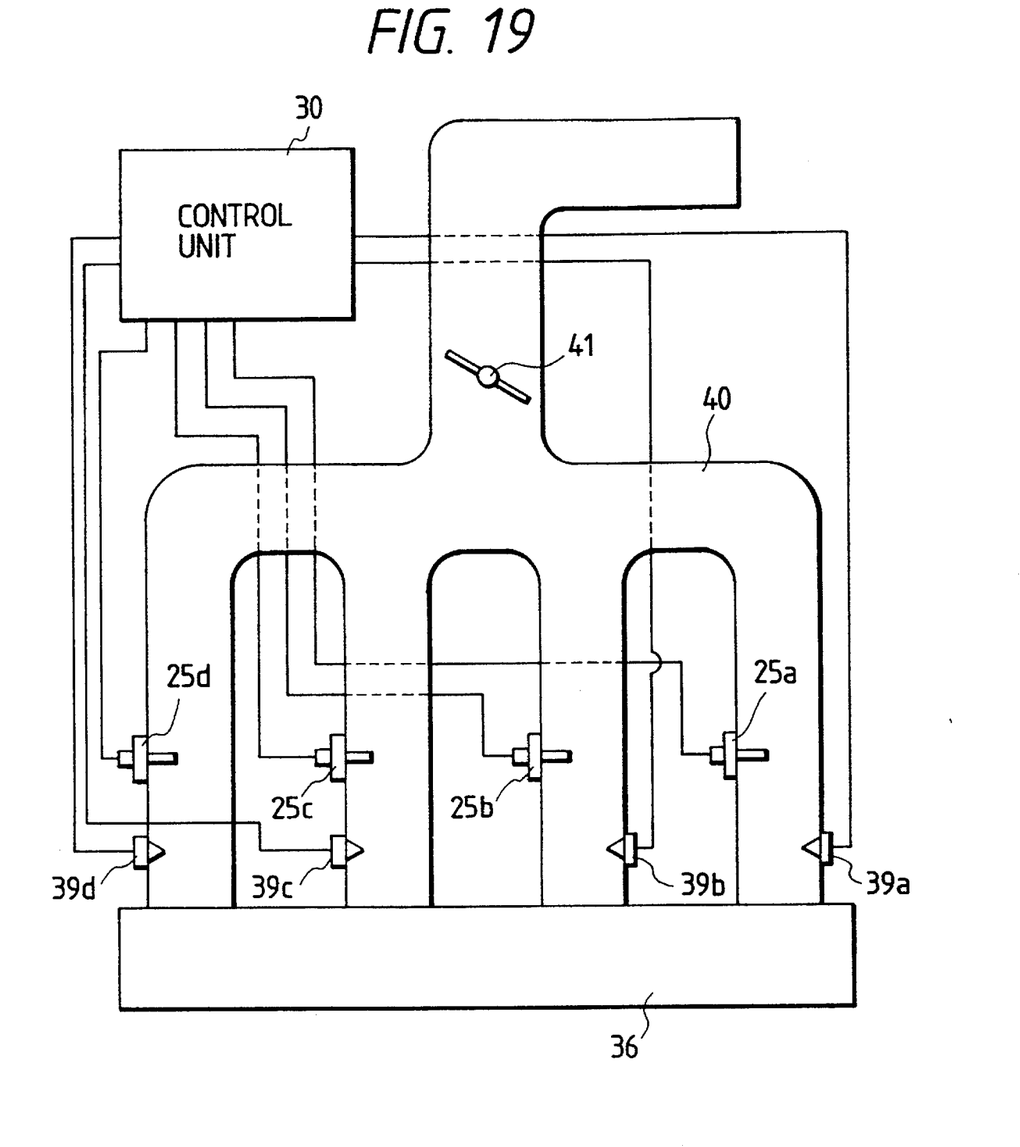
FIG. 19 is a schematic block diagram showing another fuel injection system including the plate like unit.

FIG. 19 is a block diagram showing an actual application of four units 25a, 25b, 25c, and 25d each having a four-terminal structure with a connector 23 as shown in FIG. 16 or 17 to individual cylinders of an engine 36 for the purpose of finer control of the engine 36. In FIG. 19, reference numeral 30 denotes a control unit for driving the four units 25a to 25d respectively located in four branch pipes of an intake manifold 40 and detecting signals from the four units 25a to 25d. Then, the control unit 30 controls four fuel injectors 39a, 39b, 39c, and 39d respectively located in the four branch pipes of the intake manifold 40 according to the signals from the four units 25a to 25d. Reference numeral 41 denotes a throttle valve.

Figure 20:
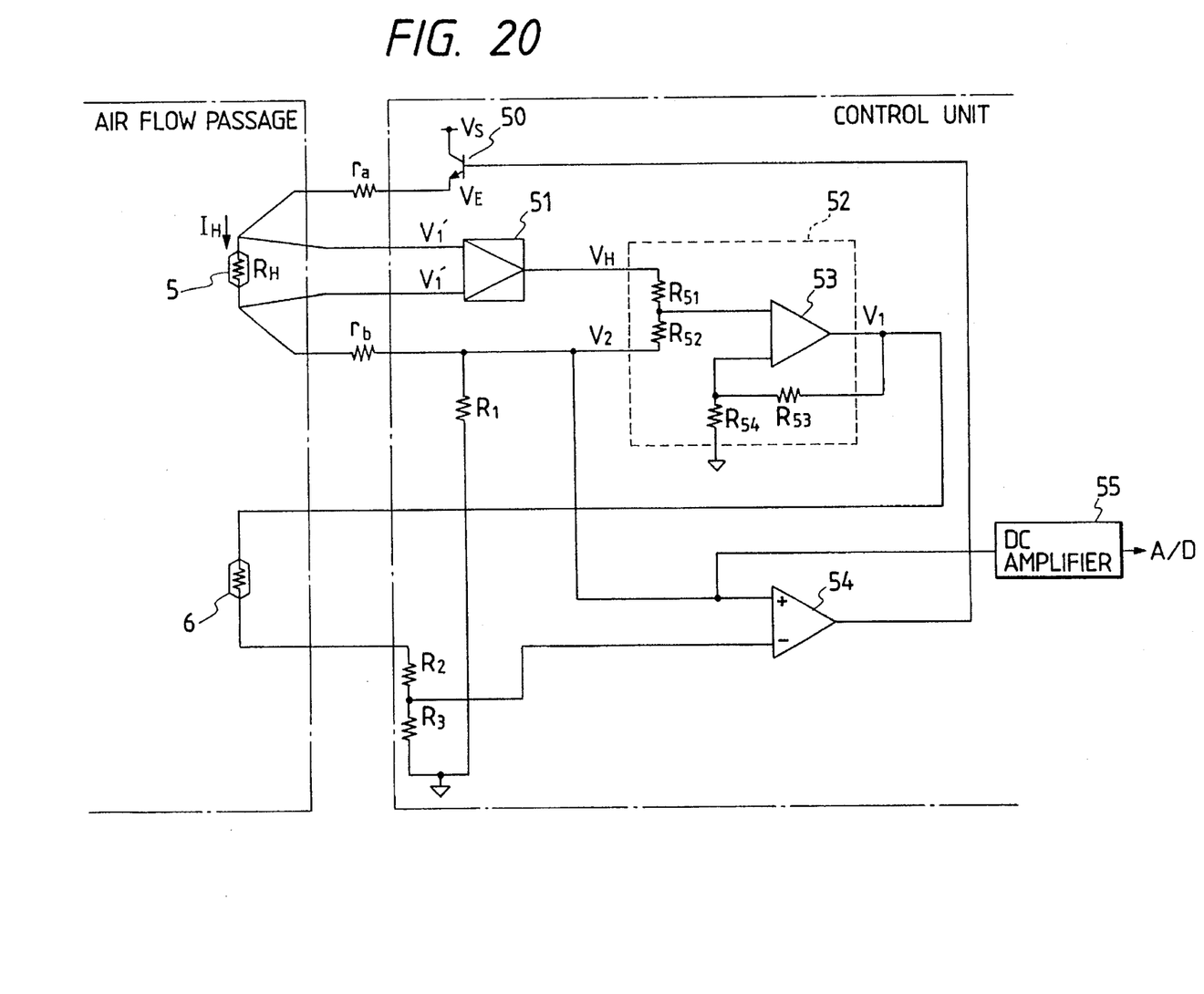
FIG. 20 is a circuit showing an embodiment of an air flow meter in the present invention.

FIG. 20 is a circuit showing an embodiment of an air flow in accordance with the present invention. The heating resistor 5 and the temperature sensing resister 6 are disposed in an air flow passage. The power transistor 50, differential amplifier 51, to which is supplied the voltage across the heating resistor 5, the summing circuit 52, the operational amplifier 54 and DC amplifier 55 are disposed in the control unit. The summing circuit 52 comprises the operation amplifier 53 and resistors $R_{51}$, $R_{52}$, $R_{53}$, $R_{54}$. $V_H(=V_1'-V_2)$ is supplied to the amplifier 53 and $V_1=(V_H+V_2)$ is supplied the amplifier 54. The current flow corresponding to $V_1$ is supplied to the temperature sensing resistor 6. Therefore, according to the embodiment of FIG. 20, it is not influenced by the resistor $r_a$ and $r_b$.

According to the present invention, an air flow rate can be detected highly accurately without any influence of wires etc.

We claim:

1. A meter for measuring air flow by resistance heating comprising;

a heating resistor, a temperature sensing resistor, a control device, a first pair of leads operatively connecting first and second parts of the heating resistor to the control device, and a second pair of leads operatively connecting the temperature sensing resistor to the control device, the control device being arranged to apply a controlled current to the heating resistor via the first pair of leads;

a third pair of leads connecting the first and second parts to a differential amplifier of the control device to measure a voltage drop across the first and second parts and minimize in air flow measurement and influence of resistance in the first pair of leads.

2. A meter according to claim 1, wherein said first and second parts are both ends of said heating resistor.

3. A meter according to claim 1, wherein said first and second parts are one end of said heating resistor.

4. A meter for measuring air flow by resistance heating, comprising;

a heating resistor, a temperature sensing resistor and a control device being operatively connected to the heating resistor and to the temperature sensing resistor and having a first means for applying a current to the heating resistor and a second means electrically connected with the first means and having leads to the heating resistor for measuring a voltage drop thereacross.

\* \* \* \* \*